Figure 1:
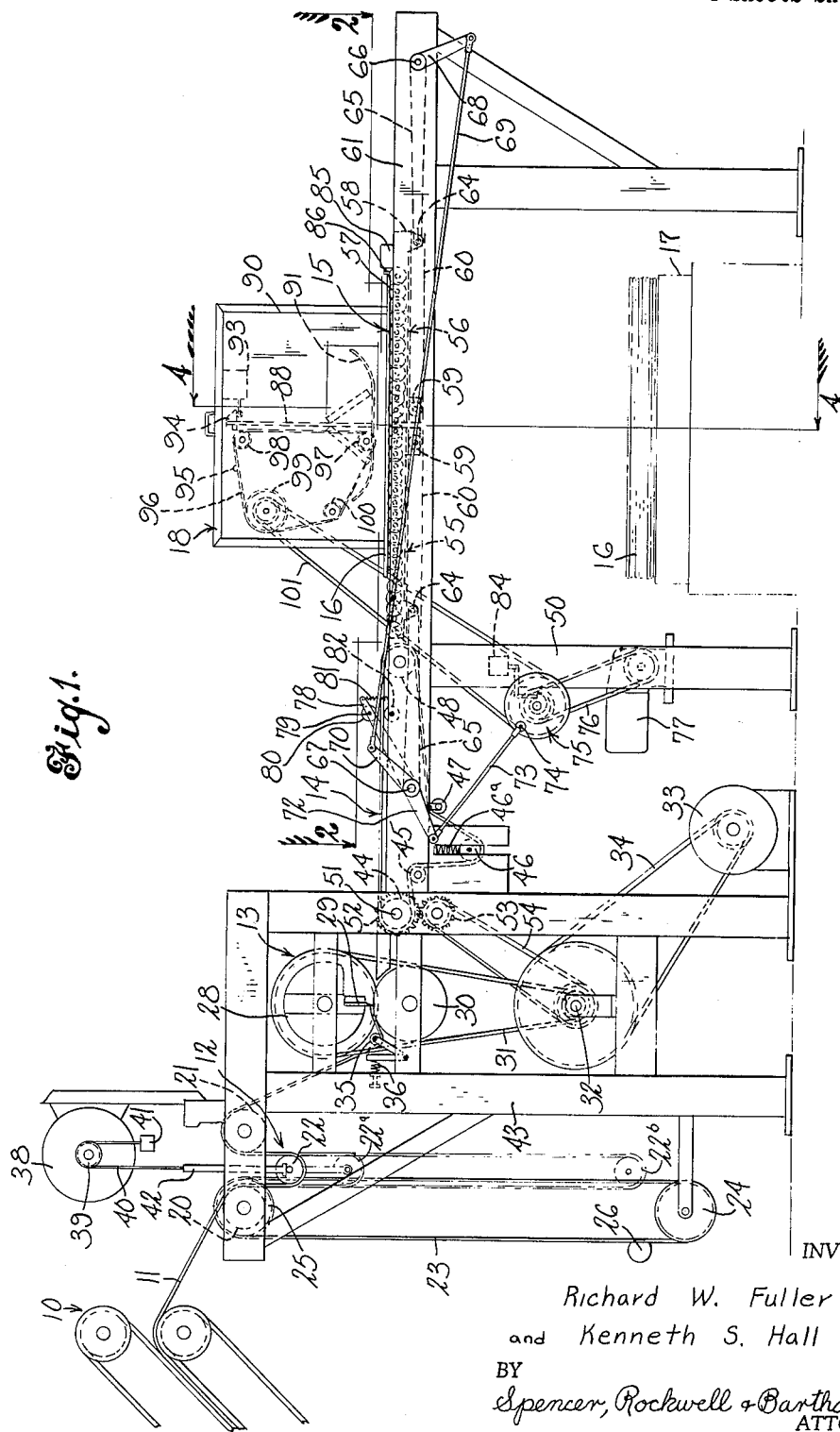

Sept. 7, 1965  R. W. FULLER ETAL  3,204,502
APPARATUS FOR CUTTING AND STACKING SHEET MATERIAL
Filed March 1, 1961  4 Sheets-Sheet 1

INVENTORS
Richard W. Fuller
and Kenneth S. Hall
BY
Spencer, Rockwell & Bartholow
ATTORNEYS INVENTORS
Richard W. Fuller
and Kenneth S. Hall
BY
Spencer, Rockwell & Bartholow
ATTORNEYS

United States Patent Office 3,204,502
Patented Sept. 7, 1965

3,204,502
APPARATUS FOR CUTTING AND STACKING SHEET MATERIAL
Richard W. Fuller, Orange, and Kenneth S. Hall, Hamden, Conn., assignors to Farrel Corporation, a corporation of Connecticut
Filed Mar. 1, 1961, Ser. No. 92,666
2 Claims. (Cl. 83—96)

This invention relates to a cutter-stacker for sheet material such as plastic material, for example, although it may be employed in other relations where it is desired to cut a strip of material into sheets and stack these sheets one upon the other to be delivered to some point for further operations.

In the processing of rubber and other plastic materials the material is mixed in a suitable mixer such as the well-known "Banbury" type mixer and delivered from the mixer in relatively long strips. It is then desired to cut this strip into sheets and stack the sheets one upon the other for further processing.

In a device of this type the strip of material may be continuously delivered from the mixer, and the operation of cutting and stacking the material may be intermittently performed. It is, therefore, necessary to synchronize the continuous delivery of the material with the intermittent operation of the stacking device in order that the continuous flow of the material will be permitted and the strips cut therefrom properly stacked without delay in the operation. To this end the strip of material delivered from the mixer is brought past a rotary cutter where it is cut into sheets, and each sheet is delivered to a stacking device at a greater speed than that of the delivery of the strip to the cutting mechanism. This permits the stacking device or stacking mechanism to operate intermittently while the feed to the cutting mechanism is continuous.

It is also desirable that provision be made for the removal of the stacked sheets and for the surplus material delivered from the mixer while this is being done. The sheets may be stacked upon a skid and a certain amount of time is required for removal of this skid and its replacement by an empty one. During this period the strip will continue to be fed toward the cutting mechanism which will not be in operation, and this surplus material must be "stored" in some way during the period that the cutting mechanism is at rest.

As illustrated the mechanism comprises a pair of rolls between which the strip of material is fed, one of these being provided with a knife or severing memebr for severing the material and the other acting as an anvil roll against which the material is severed. These rolls also act as feed rolls, and between these rolls and the delivery mechanism is a festoon unit which is so arranged that it will not only control the speed of the cutter roll but will also provide for the accumulation of the strip which is fed to the festoon unit during the period required for replacement of one skid by another.

Forwardly of the cutter roll is a conveyor which delivers the sheets to a stacker unit. This conveyor will be preferably driven at a greater surface speed than the surface speed of the cutter roll so that when a sheet has been cut, it is moved away from the cutter roll at a greater speed than the next succeeding sheet is fed to the cutter roll. This arrangement permits one of the cut sheets to be discharged by the stacking mechanism and the latter returned to its original position before the succeeding sheet is delivered thereto. Therefore, although the stacker mechanism will be actuated intermittently during the loading of one skid, the cutter roll may be constantly driven during this period. As has already been stated, the rotation of the cutter roll is discontinued during the removal and replacement of the skids.

One object of the present invention is to provide a new and improved cutter-stacker mechanism for sheets of material such as plastic material, for example, although it may be employed with strips of other material as well.

A further object of the invention is to provide a new and improved cutter-stacker mechanism which may continuously receive a strip of material, cut the material into sheets, and stack the cut sheets one upon the other.

A still further object of the invention is to provide a new and improved cutter-stacker mechanism of the character described wherein the cut sheets will be delivered upon a sectional support or table, the sections of the table being movably mounted and spread apart at the proper time so that the cut sheets may drop therefrom upon a skid or other device designed to receive them.

A still further object of the invention is to provide a new and improved cutter-stacker mechanism as described above wherein a guide or pusher member is employed to insure the dumping or delivering of the cut sheets from the table, when the sections of the latter are separated, so that they may drop upon a support or skid adapted to receive them.

To these and other ends the invention consists in the novel features and combinations of parts to be hereinafter described and claimed.

Figure 2:
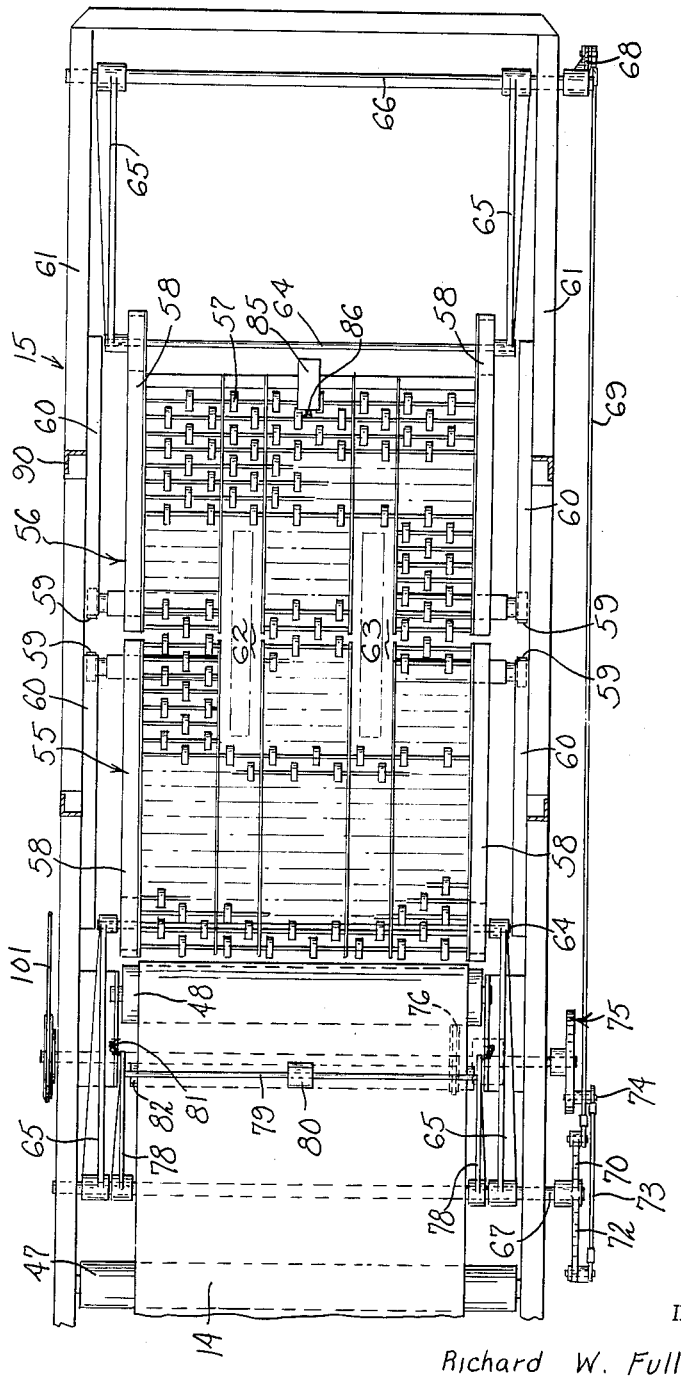
Figure 3:
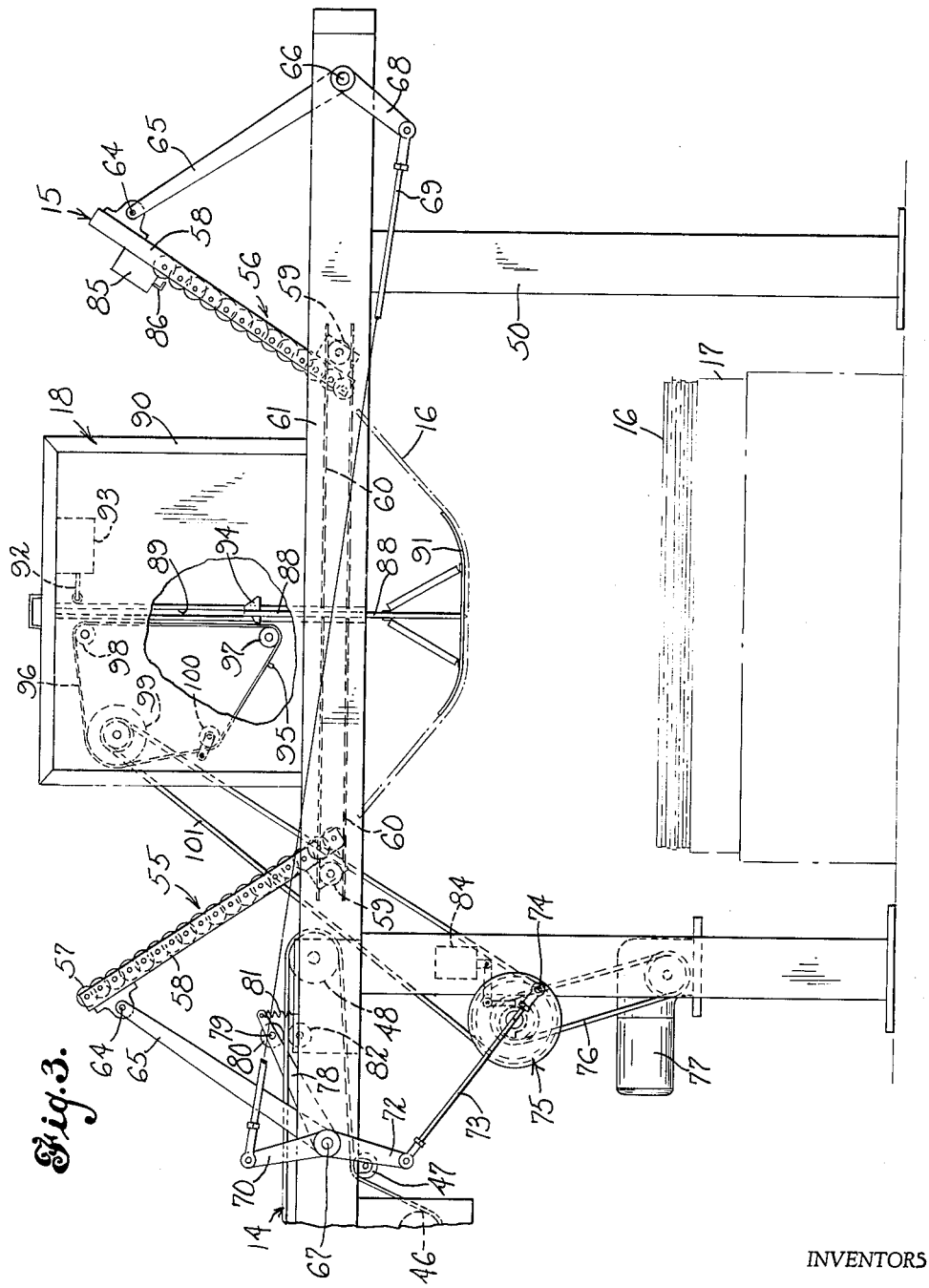
Figure 4:
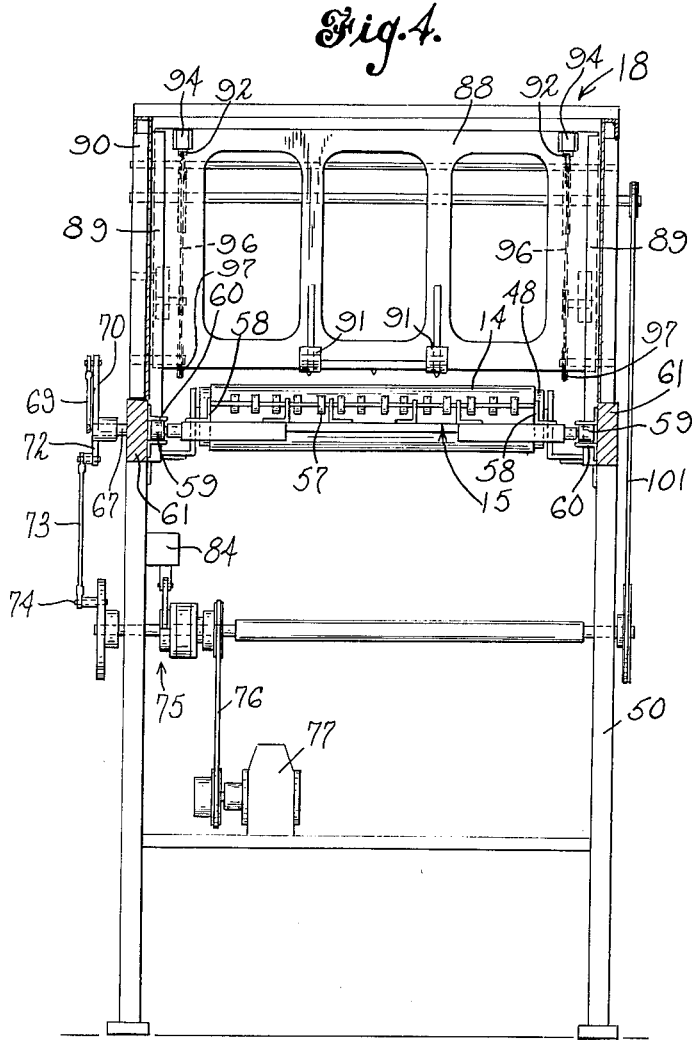

In the accompanying drawings:
FIG. 1 is an elevational view of a cutter-stacker mechanism embodying our improvements;
FIG. 2 is a top plan view of the cutter-stacker mechanism, the view being taken substantially on line 2—2 of FIG. 1;
FIG. 3 is a side elevational view of the stacking mechanism showing the table sections in open position; and
FIG. 4 is a sectional view on line 4—4 of FIG. 1.

Referring to FIG. 1 of the drawings, we have shown a delivery mechanism designated generally by the numeral 10 to receive a strip 11 of plastic or like material and deliver it to the festoon unit designated generally by the numeral 12. From this unit the strip passes to the cutting unit designated generally at 13 which will be described more particularly hereinafter. The strip is cut into sheets by the cutting unit and delivered to a conveyor designated by the numeral 14 by which it is carried to the sectional stacking table 15.

When the sections of the table open, as shown in FIG. 3, the cut sheets indicated at 16 are discharged upon a skid or the like 17 to be carried to any desired place for further processing. A guide or pusher unit designated generally at 18 is mounted above the stacking table to insure the discharge of the sheets therefrom.

Referring particularly to FIG. 1, the festoon unit comprises a pair of rotatably mounted guide rolls 20 and 21 around which the sheet 11 is led in its passage to the cutting unit. Between these rolls is mounted an dancer roll 22, this roll being rotatably carried by a freely moving belt 23 trained around idler rollers 24 and 25, the latter being on the same axis as the guide roll 20. With this construction it will be apparent that tension on the strip will tend to urge the dancer roll 22 upwardly while its weight will tend to urge it downwardly and maintain the strip in taut condition. A counterweight 26, if desired, may be mounted upon the belt 23 tending to counteract the weight of the roll 22.

The strip passes from the guide roll 21 to the bite of the cutter roll 28 provided with the severing knife 29 and the anvil roll 30. The cutter roll is driven by a belt 31 from a shaft 32 driven in turn by the motor 33 through the belt 34. A spring-loaded tension roll 35 is provided adjacent the anvil roll 30, this tension roll being urged toward the anvil roll by the spring 36 to maintain tension upon the strip.

The rolls 28 and 30 act as feed rolls to carry forwardly the strip delivered by the delivery mechanism 10. It will be apparent that, if the speed at which the roll 28 is driven is slower or faster than the speed at which the strip is delivered to the festoon unit, the dancer roll 22 will move downwardly or upwardly as the case may be, and this roll may during the operation of the feeding unit move from its upper full-line position, shown in FIG. 1, to the dotted-line position 22ᵃ shown in this figure. Means controlled by this movement of the dancer roll is provided to control the speed of the motor 33 and, therefore, of the driven cutter roll 28.

This means comprises a rheostat shown diagrammatically at 38 actuated by a rotatable pulley 39 around which is trained a cable 40 carrying weights 41 and 42 at its respective ends. The latter weight rests upon a portion of the dancer roll 22 and is of greater mass than the weight 41. Therefore, as the dancer roll moves downwardly, the weight 42 will also move downwardly, turning the pulley 39 and actuating the rheostat to increase the speed of the motor 33. As the dancer roll 22 moves upwardly, the weight 41 will predominate as a part of the weight 42 will be carried by the dancer roll and the rheostat will be moved in the opposite direction to decrease the speed of the motor 33.

It may here be noted that the parts heretofore described are all mounted upon a supporting frame 43 which carthe festoon unit as well as the cutter unit and the pulley 32 from which the cutter unit is driven.

The conveyor 14 is trained about guide rolls 44, 45, 46, 47 and 48, all shown in FIG. 1. The roll 46 is a tension or take-up roll and urged downwardly by the spring 46ᵃ so as to maintain the conveyor 14 taut and to provide a horizontal run between the rolls 44 and 48.

As previously stated, the conveyor 14 is moved at a faster surface speed than that of the cutter roll 28 so as to carry the cut sheet away from the cutter rolls and give the discharging or dumping mechanism time to operate before another cut sheet is presented thereto. The pulleys supporting the conveyor 14 are mounted upon a frame designated generally by the numeral 50 which also supports the collapsing table and guide unit which will be later described in detail although the frames 43 and 50 may be considered as parts of a single frame structure to support the entire mechanism.

On the shaft 51 of the roll 44 is a gear 52 meshing with a gear 53 drivin by a belt 54 from the shaft 32, the speed of the conveyor being determined by the ratio of the gears. If desired, the conveyor may, of course, be driven from a separate motor.

From the conveyor 14 the sheets are delivered to the sectional table 15. As shown more particularly in FIGS. 2 and 3, this table consists of two sections 55 and 56 of similar construction. Each of these tables is provided with a plurality of transversely extending rollers 57 mounted in side frames 58. Carried by each of the frames at the inner end thereof are rollers 59, one at each side of the frame, riding in inwardly directed tracks 60 carried by the longitudinally extending frame member 61 so that these table sections may be moved from their horizontal positions shown in FIG. 1 to the inclined positions shown in FIG. 3. It may also be noted that, as shown in FIG. 2, each of the table sections is provided with openings 62 and 63 to permit the elements of the sheet guide or pusher unit to enter therein as will be described hereinafter.

To each of the frames 58 is pivoted at 64 a pair of arms 65, one at each side of each of the frames, which arms are secured to rods 66 and 67 rotatably mounted in the member 61. Secured to the rod 66 is a crank member 68 connected by a pivoted link 69 to the arm 70 of a double-armed crank member secured to the rod 67 rotatably mounted in the member 61. To the other arm 72 of this crank member is pivoted one end of a link 73, the other end being carried by the crank pin 74 of a single-revolution clutch member 75 of usual construction. This clutch member is rotated by a belt 76 from a motor 77 carried on the frame.

Pivoted upon the rod 67 adjacent the ends thereof are a pair of arms 78 carrying at their free ends a rod 79 upon which is rotatably mounted a roller 80 urged toward the conveyor 14 by the spring 81, which roller bears against the cut sheet. A backing roller 82 may be rotatably mounted on the frame below the conveyor and opposite the roller 80 if such is desired.

The clutch 75 may be set into rotation by a controlling solenoid 84 which is actuated in turn by a switch 85 mounted upon the table section 56, this switch having an actuating member 86 adapted to be engaged by the forward edge of a sheet delivered to the collapsing table structure by the conveyor 14. In other words, when a cut sheet is advanced by the conveyor 14 until its front edge strikes the member 86, the clutch 75 is set into motion and makes one revolution. This revolution of the clutch through the links 65 and mechanism connected thereto first moves the table sections 55 and 56 from their horizontal positions shown in FIG. 1 to their inclined positions shown in FIG. 3, and thereafter returns them to their original position. With these sections in the position shown in FIG. 3, the cut sheet is free to drop upon the skid 17.

In order to insure the discharge of the sheet a sheet guide or pusher member is provided to engage the sheet and urge it downwardly. This pusher member comprises a plate 88 (FIG. 4), the lateral edges of which are slidably mounted in guides 89 of a frame 90 mounted upon the members 61. Upon the lower edge of this plate are a pair of curved shoes 91 (FIG. 3 and 4) normally held in a position above the table but, when released, may descend by gravity to engage the cut sheet and push it downwardly. These shoes, as shown in FIG. 2, are of a size to be received through the openings 62 and 63 in the table sections provided the latter have not completely cleared when the pusher member descends.

This guide or pusher member is held in its upward position by plungers 92 of solenoids 93, one at each edge of the frame 90, which plungers engage below lugs 94 provided on the plate 88. The lugs 94 also extend on the other side to the opposite side of the plate 88 and are adapted to be engaged by fingers 95 on belts 96 trained around pulleys 97, 98, 99 and a take-up or tension pulley 100. The pulley 99 is driven by a belt 101 from the single-revolution clutch 75, the parts being so proportioned that a single revolution of the clutch will effect a complete traverse of the belt 96. The solenoid 93, as is the case with the solenoid 84, is actuated by the switch 85 when the member 86 is engaged by the forward edge of a cut sheet.

With this construction it will be seen that when a sheet has arrived upon the table sections in position to be discharged and engages the switch 86, the table sections will be moved from their horizontal positions shown in FIG. 1 toward their inclined positions shown in FIG. 3. At the same time the plunger 92 of the solenoid 93 will be withdrawn from below the lug 94 and allow the sheet guide or pusher member to drop by gravity from its upper position above the sheet shown in dotted lines in FIG. 1 to the position shown in FIG. 3. The shoes 91 contact the sheet and insure its discharge upon the skid 17.

Upon continued rotation of the clutch the table sections 55 and 56 are returned to their normal horizontal positions and the fingers 95 upon the belts 96 engage below the adjacent portions of the lugs 94 and raise the sheet guide or pusher member upwardly to its original position where the plungers 92 engage below the lugs 94. It will be noted that the lugs 94 are beveled on their upper surfaces to permit this action.

When it is desired to remove one of the skids 17 and replace it by another, the motor 33 may be shut off and the feed of the sheets to the conveyor 14 thereby stopped. During this period which is of longer duration than the time required for dumping the sheet, the dancer roller 22 may move downwardly to the dotted-line position shown at 22ᵇ in FIG. 1 so as to permit the delivery mechanism 10 to continue the delivery of the strip to the cutter-stacker mechanism, the accumulation of the strip so delivered being thus absorbed between the guide rolls 20 and 21. When the motor 33 is again started, the plunger 42 will be at its lowermost position and the speed of the motor 33 as regulated by the rheostat 38 will be at a maximum. The slack in the strip between the rollers 20 and 21 will be gradually taken up and thereafter the dancer roll 22 will vary between its uppermost position and the position shown at 22ᵃ during the loading of another skid.

While we have shown and described one embodiment of our invention, it will be understood that it is not to be limited to all of the details shown, but is capable of modification and variation within the spirit of the invention and within the scope of the claims.

What we claim is:

1. An apparatus for stacking sheets of material as they are continuously cut from an advancing strip of said material comprising advancing means for continuously moving said strip from a source along a given path, cutting means positioned along said path for separating said strip into sheets, a table having at least two separable sections for receiving said sheets, conveying means for transferring said sheets individually from said cutting means to said table, drive means operable cyclically and actuated by the receipt of a sheet upon said table to separate said sections periodically to permit individual sheets to drop downwardly through the table in sequence and in response to the pull of gravity so that one sheet stacks upon another, and a pusher means synchronized with said drive means operative to engage and push each sheet to aid gravity in stacking one sheet upon another.

2. An apparatus for stacking sheets of materials as they are continuously cut fro man advancing strip of said material comprising advancing means for continuously moving said strip from a source along a given path, cutting means positioned along said path for separating said strip into sheets, a table having at least two separable sections for receiving said sheets, conveying means for transferring said sheets individually from said cutting means to said table, drive means operable cyclically and actuated by the receipt of a sheet upon said table to move said sections periodically, said drive means including means operable to move said sections from a first position wherein both sections are disposed adjacent and coplanar in condition to receive an individual sheet to a second position wherein the sections are separated and inclined to permit the sheets to drop downwardly in sequence in response to the pull of gravity so that one sheet stacks upon another, and pusher means synchronized with said drive means operative to engage and push each sheet when the sections are separated to aid gravity in stacking one sheet upon another.

References Cited by the Examiner

UNITED STATES PATENTS

| | | | |
|---|---|---|---|
| 1,089,834 | 3/14 | Goldberg | 83—157 |
| 1,108,971 | 9/14 | Clark | 83—76 |
| 1,296,934 | 3/19 | Drouilly | 83—29 |
| 1,358,340 | 11/20 | Schumacher | 83—29 |
| 1,787,572 | 1/31 | English | 214—88 |
| 2,327,103 | 8/43 | Gude | 83—94 |
| 2,697,488 | 12/54 | Stempel | 83—96 |
| 2,733,921 | 2/56 | Downs | 271—68 |
| 2,769,495 | 11/56 | Pomper | 83—96 |
| 2,831,684 | 4/58 | Cundall | 83—94 X |
| 2,908,329 | 10/59 | Powell | 83—524 |
| 2,971,414 | 2/61 | Owen | 83—110 |
| 3,064,827 | 11/62 | Bostock et al. | 214—6 |

ANDREW R. JUHASZ, *Primary Examiner.*

WILLIAM W. DYER, JR., CARL W. TOMLIN,
*Examiners.*

UNITED STATES PATENT OFFICE
CERTIFICATE OF CORRECTION

Patent No. 3,204,502　　　　　　　　　　　　September 7, 1965

Richard W. Fuller et al.

It is hereby certified that error appears in the above numbered patent requiring correction and that the said Letters Patent should read as corrected below.

Column 1, line 49, for "mempbr" read -- member --; column 3, line 27, for "car-" read -- carries --.

Signed and sealed this 19th day of April 1966.

(SEAL)
Attest:

ERNEST W. SWIDER
Attesting Officer

EDWARD J. BRENNER
Commissioner of Patents